United States Patent
Kim et al.

(10) Patent No.: US 12,151,693 B2
(45) Date of Patent: Nov. 26, 2024

(54) VEHICLE AND AUTONOMOUS DRIVING SYSTEM

(71) Applicants: Hyundai Motor Company, Seoul (KR); Kia Corporation, Seoul (KR); Hyundai AutoEver Corp., Seoul (KR)

(72) Inventors: Sung Yun Kim, Seoul (KR); Daegil Cho, Suwon-si (KR); Seung Hwan Shin, Seoul (KR); Bong-Ju Kim, Yongin-si (KR)

(73) Assignees: HYUNDAI MOTOR COMPANY, Seoul (KR); KIA CORPORATION, Seoul (KR); HYUNDAI AUTOEVER CORP., Seoul (KR)

( * ) Notice: Subject to any disclaimer, the term of this patent is extended or adjusted under 35 U.S.C. 154(b) by 333 days.

(21) Appl. No.: 17/526,226

(22) Filed: Nov. 15, 2021

(65) Prior Publication Data

US 2022/0194398 A1    Jun. 23, 2022

(30) Foreign Application Priority Data

Dec. 18, 2020  (KR) .......... 10-2020-0179088

(51) Int. Cl.
 *B60W 50/029* (2012.01)
 *B60W 50/02* (2012.01)
 *B60W 60/00* (2020.01)

(52) U.S. Cl.
 CPC ...... *B60W 50/029* (2013.01); *B60W 50/0205* (2013.01); *B60W 60/001* (2020.02);
 (Continued)

(58) Field of Classification Search
 CPC .......... B60W 50/029; B60W 50/0205; B60W 60/001; B60W 2050/0215;
 (Continued)

(56) References Cited

U.S. PATENT DOCUMENTS

2008/0082265 A1* 4/2008 Chen .............. G01C 21/26
                                                    701/472
2009/0088931 A1* 4/2009 Budde ............... E02F 9/265
                                                    701/50

(Continued)

FOREIGN PATENT DOCUMENTS

KR     20190100482 A     8/2019

OTHER PUBLICATIONS

Qian, Xiangjun, "Model Predictive Control for Autonomous and Cooperative Driving", Automatic Control Engineering, HAL ID: tel-01635261, Nov. 14, 2017, retrieved from https://pastel.archives-ouvertes.fr/tel-01635261, 137 total pages.

*Primary Examiner* — Jason Holloway
*Assistant Examiner* — Madison B Emmett
(74) *Attorney, Agent, or Firm* — SLATER MATSIL, LLP

(57) ABSTRACT

An embodiment vehicle for performing autonomous driving includes a memory configured to store map information, a sensor configured to acquire surrounding objects information related to the vehicle, a communicator configured to communicate with a server and a surrounding vehicle, and a controller configured to form autonomous driving data for the autonomous driving of the vehicle based on the map information and data acquired through the sensor and the communicator, wherein the controller is configured to cause performance of the autonomous driving of the vehicle based on the autonomous driving data formed at a time point closest to a time point at which a failure of the sensor occurs in response to the failure of the sensor and a determination that driving of the vehicle by a driver is not available.

18 Claims, 7 Drawing Sheets

(52) U.S. Cl.
CPC . *B60W 2050/0215* (2013.01); *B60W 2520/10* (2013.01); *B60W 2520/12* (2013.01); *B60W 2552/05* (2020.02); *B60W 2555/20* (2020.02); *B60W 2556/45* (2020.02)

(58) Field of Classification Search
CPC ......... B60W 2520/10; B60W 2520/12; B60W 2552/05; B60W 2555/20; B60W 2556/45; B60W 60/00186; B60W 60/0053; B60W 60/0011; B60W 50/02; B60W 2556/65; B60W 60/0015; B60W 40/02; B60W 40/08; B60W 40/105; B60W 60/0051; B60W 2040/0818; B60R 21/0134; G05D 1/0055; G05D 1/0061; G05D 1/0238; G05D 2201/0213

See application file for complete search history.

(56) References Cited

U.S. PATENT DOCUMENTS

| | | | | |
|---|---|---|---|---|
| 2018/0229737 A1* | 8/2018 | Towal | ................. | B60W 30/165 |
| 2019/0337497 A1* | 11/2019 | Scheuerell | ............. | B60T 8/171 |
| 2020/0339151 A1* | 10/2020 | Batts | ................... | B60W 60/001 |
| 2021/0294350 A1* | 9/2021 | Konrardy | ........... | G06Q 30/0284 |
| 2024/0110812 A1* | 4/2024 | Srikanth | ............. | G01C 21/387 |

* cited by examiner

VEHICLE AND AUTONOMOUS DRIVING SYSTEM

CROSS-REFERENCE TO RELATED APPLICATIONS

This application claims the benefit of Korean Patent Application No. 10-2020-0179088, filed on Dec. 18, 2020, which application is hereby incorporated herein by reference.

TECHNICAL FIELD

The present disclosure relates to a vehicle and an autonomous driving system.

BACKGROUND

An autonomous driving technology of a vehicle is a technology that automatically drives the vehicle by recognizing road conditions without a driver controlling a brake, a steering wheel, or an accelerator pedal, and the like.

An autonomous driving technology is known for a core technology for smart car implementation. For autonomous vehicles, an autonomous driving technology includes a highway driving assistance (HAD) system that automatically maintains a distance between vehicles, a blind spot detection (BSD) system that detects nearby vehicles in a backward direction and sounds an alarm, an autonomous emergency braking (AEB) system that operates a brake device when a vehicle in front is not recognized, a lane departure warning system (LDWS), a lane keeping assist system (LKAS) that compensates for lane departure without a turn signal, an advanced smart cruise control (ASCC) technology that maintains a fixed speed while maintaining a distance between vehicles at a preset speed, a traffic jam assist (TJA) system, a parking collision-avoidance assist (PCA), and a remote smart parking assist system, or the like.

On the other hand, an autonomous vehicle with Level 4 or higher may be able to correspond with another vehicle by itself even in the event of a vehicle failure. Therefore, to develop an autonomous vehicle with Level 4 or higher, a technology for minimizing a risk of driving in a vehicle failure situation is required, and research on this has been actively conducting.

SUMMARY

The present disclosure relates to a vehicle and an autonomous driving system. Particular embodiments relate to a vehicle and an autonomous driving system for performing autonomous driving.

Therefore, an embodiment of the present disclosure provides a vehicle and an autonomous driving system capable of safe autonomous driving using map information and communication with a server when a sensor failure in the vehicle occurs.

Additional embodiments of the disclosure will be set forth in part in the description which follows and, in part, will be obvious from the description, or may be learned by practice of the disclosure.

In accordance with an embodiment of the present disclosure, a vehicle for performing autonomous driving includes a storage configured to store map information, a sensor configured to acquire surrounding objects information related to the vehicle, a communicator configured to communicate with a server and a surrounding vehicle, and a controller configured to form autonomous driving data for the autonomous driving of the vehicle based on the map information and data acquired through the sensor and the communicator, wherein when a failure of the sensor occurs and driving of the vehicle by a driver is impossible, the controller is configured to perform the autonomous driving of the vehicle based on the autonomous driving data formed at a time point closest to a time point when the failure of the sensor occurs.

The controller, when the failure of the sensor occurs, may be configured to perform the autonomous driving of the vehicle by sequentially using the surrounding objects information, communication data with the surrounding vehicle, communication data with the server, and the map information.

The controller may be configured to assign weights to the surrounding objects information acquired at the time point closest to the time point when the failure of the sensor occurs.

The controller may be configured to transmit a minimum risk maneuver (MRM) to the server based on a region in which the vehicle travels, and when a level of the MRM is lower than a level of a reference MRM stored in the server, receive the reference MRM and control the vehicle.

The controller may be configured to update the MRM through communication with the server based on a road condition in which the vehicle travels.

The controller may be configured to update the MRM through communication with the server based on a weather condition in which the vehicle travels.

The controller may be configured to update the MRM through communication with the surrounding vehicle and the server.

The controller may be configured to determine a time for forming the surrounding objects information related to the vehicle based on a road on which the vehicle travels and a speed of the vehicle.

In accordance with an embodiment of the present disclosure, an autonomous driving system includes a server and a vehicle configured to communicate with the server, wherein the vehicle is configured to transmit a minimum risk maneuver (MRM) to the server when a predetermined condition is satisfied, and when a level of the MRM is lower than a level of a pre-stored reference MRM, the server is configured to transmit the reference MRM to the vehicle.

The MRM may be determined based on a road condition in which the vehicle travels and a weather condition in which the vehicle travels.

The autonomous driving system may further include a surrounding vehicle traveling around the vehicle, wherein the vehicle may be configured to update the MRM based on a positional relationship with the surrounding vehicle.

BRIEF DESCRIPTION OF THE DRAWINGS

These and/or other embodiments of the disclosure will become apparent and more readily appreciated from the following description of the exemplary embodiments, taken in conjunction with the accompanying drawings, in which.

DETAILED DESCRIPTION OF ILLUSTRATIVE EMBODIMENTS

Figure 1:
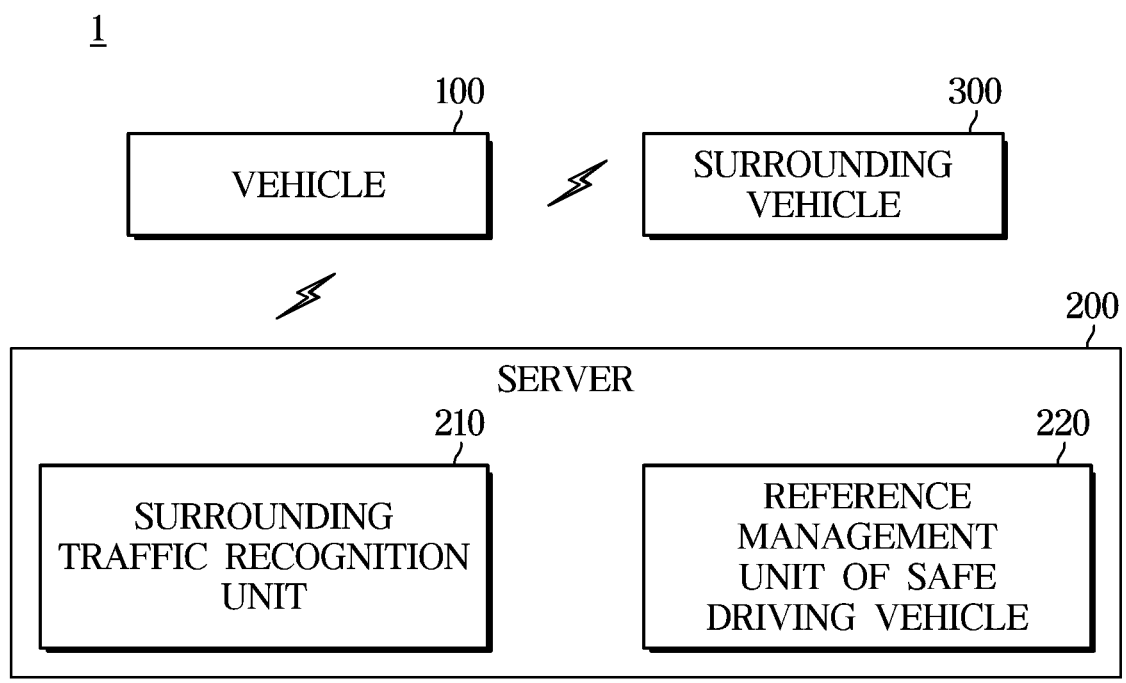
FIG. 1 is a control block diagram of an autonomous driving system according to an exemplary embodiment.

Reference will now be made in detail to the embodiments of the present disclosure, examples of which are illustrated in the accompanying drawings, wherein like reference numerals refer to like elements throughout. This specification does not describe all elements of the disclosed embodiments and detailed descriptions of what is well known in the art or redundant descriptions on substantially the same configurations have been omitted. The terms 'part', 'module', 'member', 'block' and the like as used in the specification may be implemented in software or hardware. Further, a plurality of 'parts', 'modules', 'members', 'blocks' and the like may be embodied as one component. It is also possible that one 'part', 'module', 'member', 'block' and the like includes a plurality of components.

Throughout the specification, when an element is referred to as being "connected to" another element, it may be directly or indirectly connected to the other element and the "indirectly connected to" includes being connected to the other element via a wireless communication network.

Also, it is to be understood that the terms "include" and "have" are intended to indicate the existence of elements disclosed in the specification, and are not intended to preclude the possibility that one or more other elements may exist or may be added.

Throughout the specification, when a member is located "on" another member, this includes not only when one member is in contact with another member but also when another member is present between the two members.

The terms first, second, and the like are used to distinguish one component from another component, and the component is not limited by the terms described above.

An expression used in the singular encompasses the expression of the plural, unless it has a clearly different meaning in the context.

The reference numerals used in operations are used for descriptive convenience and are not intended to describe the order of operations and the operations may be performed in a different order unless otherwise stated.

Hereinafter, embodiments of the present disclosure will be described in detail with reference to the accompanying drawings.

FIG. 1 is a control block diagram of an autonomous driving system according to an embodiment.

Referring to FIG. 1, an autonomous driving system 1 according to the embodiment may include a vehicle 100, a server 200, and a surrounding vehicle 300. The vehicle, the surrounding vehicle, and the server can communicate with each other.

A detailed operation of the vehicle 100 will be described below.

The server 200 is provided with at least one processor, and may include a surrounding traffic recognition unit 210 and a reference management unit 220 of a safe driving vehicle. Corresponding units may be provided integrally, separated in terms of hardware, or separated in terms of software.

Meanwhile, the vehicle 100 of the autonomous driving system 1 may transmit a minimum risk maneuver (MRM) to the server when a predetermined condition is satisfied.

The predetermined condition may be a condition including that the vehicle enters a plurality of MRM occurrence areas, and a currently occurred MRM is generated in a specific road condition.

When a level of the MRM is lower than a level of a pre-stored reference MRM, the server 200 may transmit the reference MRM to the vehicle.

In other words, each MRM may be formed at each level, and the higher the level, the stronger the autonomous driving strategy may be performed such that a risk of the vehicle is minimized.

On the other hand, the MRM may be determined based on a road condition in which the vehicle travels and a weather condition in which the vehicle travels.

Specifically, the road condition may include a case in which a problem occurs on the road ahead or a breakdown occurs in a preceding vehicle.

Furthermore, the weather condition may include a frequency of occurrence of fog and a frequency of occurrence of a freezing situation on the road.

The server 200, according to the embodiment, may receive information on the frequency of occurrence of the freezing over a certain numerical value in a currently traveling road condition and determine degrees of vehicle pull and vehicle slip in consideration of lateral and longitudinal orientation angles and a slip ratio of the vehicle.

When it is determined that the degrees of vehicle pull and the vehicle slip are not a normal driving situation, MRM information may be updated in the server 200 and a non-volatile memory, and a related control may be performed.

On the other hand, the autonomous driving system 1 may further include the surrounding vehicle 300 traveling around the vehicle.

Furthermore, the vehicle 100 may update the MRM based on a positional relationship with the surrounding vehicle.

After the vehicle creates a model predictive control (MPC) model for the surrounding vehicle, the vehicle may update a related MRM information to lower a degree of risk for paths that do not cause a collision but is at high-risk.

Meanwhile, when the MRM information is updated from the MPC model, the vehicle 100 may impose constraints on a speed and a steering angle of the vehicle so as to reduce a degree of collision risk.

Herein, the above description is merely one exemplary embodiment of the autonomous driving system 1 and there is no limitation on an operation of the vehicle performing autonomous driving by communicating with the server and the surrounding vehicle.

Figure 2:
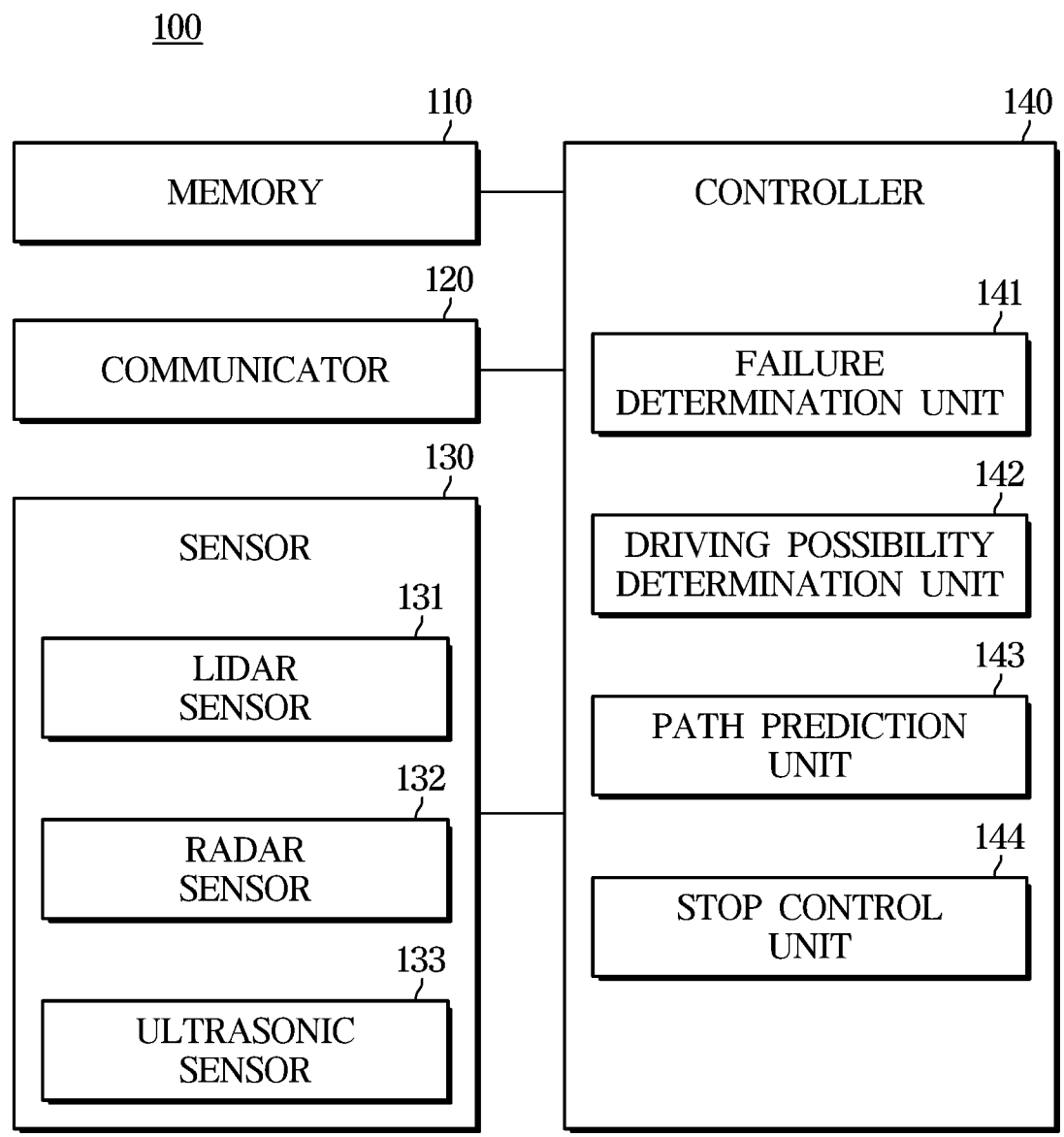
FIG. 2 is a control block diagram of a vehicle according to an exemplary embodiment.

FIG. 2 is a control block diagram of the vehicle 100 according to an embodiment.

Referring to FIG. 2, the vehicle 100 according to the embodiment may include a memory (i.e., a storage) 110, a sensor 130, a communicator 120, and a controller 140.

The memory 110 may include map information. The map information may refer to topographic data including distance information between a traveling vehicle and a surrounding obstacle.

Specifically, in consideration of nearby roads and traffic conditions, the memory 110 may variably store a precise map of a stoppable path that allows the safest stop during a normal driving in preparation for a sensor failure.

The memory 110 may be implemented as at least one of a non-volatile memory device such as a cache, a read only memory (ROM), a programmable ROM (PROM), an erasable programmable ROM (EPROM), an electrically erasable programmable ROM (EEPROM), and flash memory or a volatile memory device such as a random access memory (RAM) or a storage medium such as a hard disk drive (HDD) or a compact disc ROM, but is not limited thereto. The memory 110 may be a memory implemented as a chip separate from the processor described above with respect to the controller, or may be implemented as a single chip with the processor.

The sensor 130 may acquire surrounding objects information related to the vehicle 100.

The surrounding objects information may form occupancy information of obstacles including surrounding vehicles around the vehicle.

The sensor may include a light detection and ranging (LIDAR) sensor 131, a radar sensor 132, and an ultrasonic sensor 133.

The communicator 120 may communicate with the server and the surrounding vehicle. The communicator may perform a vehicle-to-everything (V2X) communication with the server.

The V2X may refer to a technology in which the vehicle exchanges information with other vehicles, mobile devices, roads, and the like via a wired/wireless network.

Furthermore, the communicator 120 may perform a vehicle-to-vehicle (V2V) communication with a surrounding vehicle.

The V2V may refer to the vehicle-to-vehicle communication. The V2V may refer to a technology in which the vehicles by themselves exchange information with each other using network, communication, and internet technologies.

The communicator 120 may include one or more components that enable communication with an external device, and may include, for example, at least one of a short-range communication module, a wired communication module, and a wireless communication module.

The controller 140 may include a failure determination unit 141, a driving possibility determination unit 142, a path prediction unit 143, and a stop control unit 144 in accordance with functions.

The failure determination unit 141 may determine whether all or a part of sensors have failed, and then may determine whether to use real-time sensor information or data acquired by a last stored sensor.

The driving possibility determination unit 142 may determine whether a driver is capable of overriding when a failure of the sensor is determined.

The path prediction unit 143, when it is difficult to collect information via the V2X from surrounding infrastructures and the surrounding vehicles, may create a path of the vehicle based on a predicted path of surrounding objects and a predicted curvature of the road based on the last stored sensor and the map information.

When it is determined that the driver's override is not available, e.g., impossible, upon determining the sensor failure, the stop control unit 144 may control a stop in longitudinal and lateral directions by minimizing a risk based on the predicted path of surrounding objects and a path of the vehicle based on the predicted curvature of the road by using some real-time sensors and the last stored sensor/map information.

The controller 140 may form autonomous driving data for autonomous driving of the vehicle based on map information and data acquired through the sensor and the communicator.

The autonomous driving data may refer to overall data required for the vehicle to perform the autonomous driving.

Meanwhile, when the failure of the sensor 130 occurs, the controller 140 may perform the autonomous driving of the vehicle based on the autonomous driving data formed at a time point closest to a time point when the sensor failure occurs.

The autonomous driving data formed at the closest time point may refer to data formed by the controller for autonomous driving just before the sensor failure occurs, and the types of data is not limited.

In other words, the vehicle forms autonomous driving data by each time point. However, when the sensor does not smoothly acquire data that is a basis for forming autonomous driving data, the vehicle may perform the autonomous driving of the vehicle based on the autonomous driving data formed at the time point closest to the time point when the sensor failure occurred.

When the failure of the sensor 130 occurs, the controller 140 may sequentially use the surrounding objects information, communication data with the surrounding vehicles, communication data with the server, and the map information to perform the autonomous driving of the vehicle.

Specifically, the controller 140 may preferentially acquire the surrounding objects information based on some non-failure sensors. The non-failure sensors may refer to a sensor working normally.

Next, the controller 140 may perform the autonomous driving based on the communication data with the surrounding vehicles via the V2V.

Furthermore, the controller 140 may perform the autonomous driving using the server and the map information when a failure also occurs in the communicator performing the V2V.

The controller 140 may assign weights to the surrounding objects information related to the vehicle acquired at the time point closest to the time point when the failure of the sensor 130 occurs. This operation may be performed by an object tracking and a fusion method, etc., which will be described in detail below.

The controller 140 may transmit the MRM to the server based on a region in which the vehicle travels. Specifically, the controller 140 may transmit the MRM to the server based on a condition such as the road on which the vehicle travels.

Furthermore, when the level of the MRM is lower than the level of the reference MRM stored in the server, the controller may transmit the reference MRM to the vehicle.

Furthermore, the controller may receive the reference MRM to control the vehicle.

In other words, the controller 140 may update the MRM through communication with the server based on road conditions in which the vehicle travels.

Furthermore, the controller 140 may update the MRM through communication with the server based on weather conditions in which the vehicle travels.

The controller 140 may update risk information through communication between the vehicle and the surrounding vehicles or the server. In updating, the vehicle may perform the V2X communication with the server and the V2V communication with the surrounding vehicles.

Furthermore, the controller may determine a time for forming the surrounding objects information related to the vehicle based on the road on which the vehicle travels and the speed of the vehicle. The related details thereto will be described later.

At least one component may be added or deleted corresponding to a performance of the components of the autonomous driving system and vehicle shown in FIGS. 1 and 2. Furthermore, it will be readily understood by those of ordinary skill in the art that mutual positions of the components may be changed corresponding to performance or structure of the system.

Meanwhile, each component shown in FIGS. 1 and 2 may refer to software and/or hardware components, such as a field programmable gate array (FPGA) and an application specific integrated circuit (ASIC).

Figure 3:
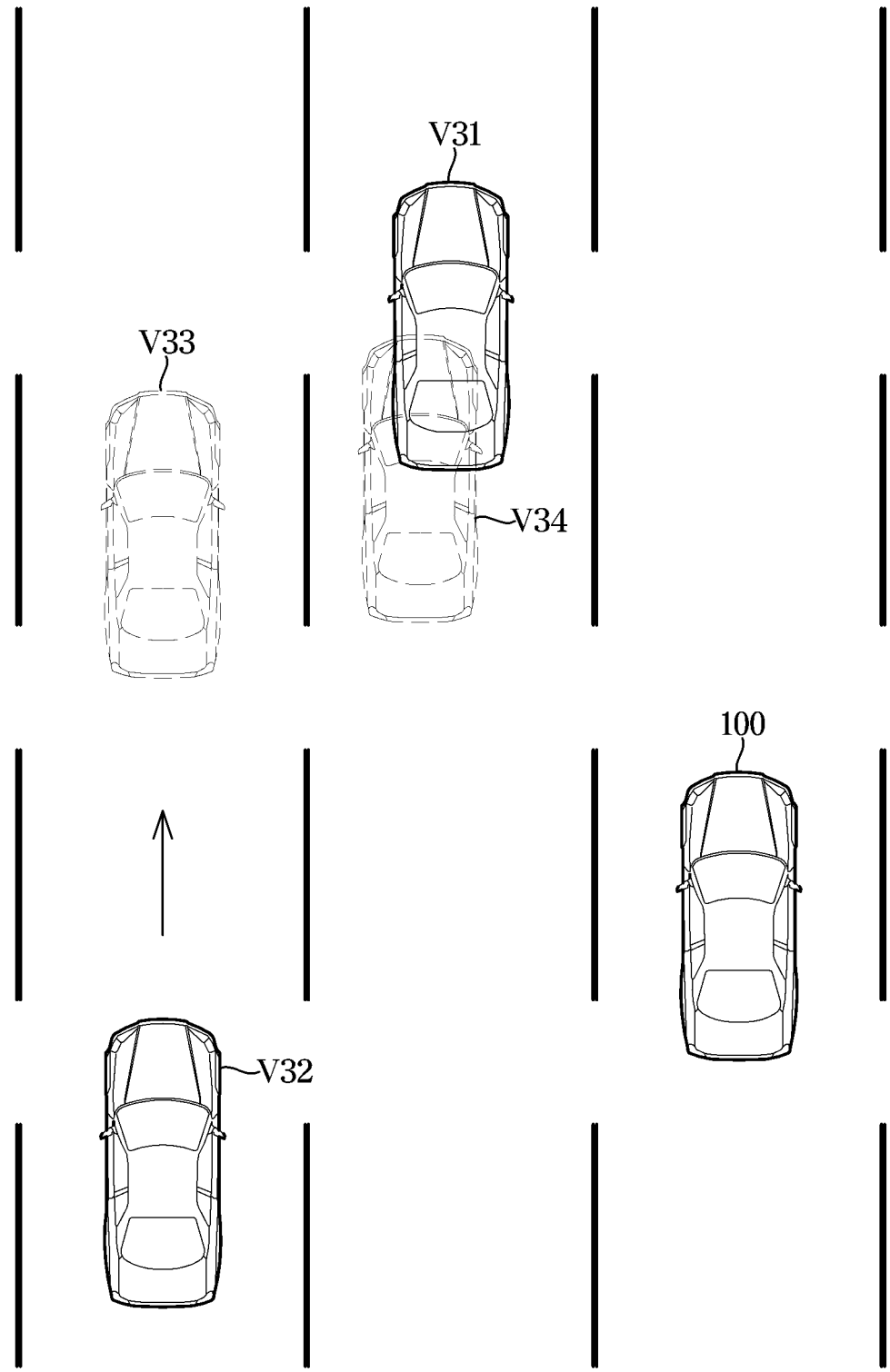
FIG. 3 is an illustrative view for explaining an operation of assigning weights to surrounding objects information according to an exemplary embodiment.

FIG. 3 is an illustrative view showing an operation of assigning weights to the surrounding objects information according to an embodiment.

Referring to FIG. 3, the vehicle 100 may assign weights to the surrounding objects information related to the vehicle acquired at the closest time point to the time point when the failure of the sensor occurs.

The controller may assign the weights to object information obtained by the sensor based on the type of a sensor module constituting the sensor.

The sensor module may include the aforementioned LIDAR, the radar sensor, and the camera.

In assigning such a weight, a fusion method of object tracking may be utilized. Specifically, the controller determines a final tracking position by reflecting a weight of a high-reliability position in a filter during Kalman filter fusion.

As for the reliability of the object tracking recognized by each sensor of the sensor 130, the latest updated information has the highest reliability. However, since the camera has the high reliability in a lateral direction and the radar sensor has the high reliability in a longitudinal direction, the reliability suitable for object fusion characteristics of each sensor may be reflected as the weight.

In other words, the controller may assign the high reliability and the weight to object information of the time point closest to the time point when the failure of the sensor occurs, and may assign different weights of the reliability by each sensor.

Referring to FIG. 3, a partial sensing position is recognized from the sensor (camera), and the controller may reflect lateral position information from the camera with a higher weight while tracking the lateral position in real-time (V31).

Furthermore, the controller may determine a last updated tracking position (V32) and a predicted tracking position (V33) from the radar included in the sensor.

Meanwhile, the vehicle may finally perform the object tracking by fusion of the V31 and the V33.

Herein, the vehicle determines positions of the surrounding vehicles based on a final position V34 and the tracking position V32 finally updated by the radar, but may assign the higher weight to information just before the failure of the sensor based on the tracking.

Furthermore, according to the embodiment, the higher weight may be given to data recognized by the camera in the lateral direction.

Furthermore, the controller may determine the weight of the longitudinal position of the radar to be greater than that of the camera.

Meanwhile, the operation described with reference to FIG. 3 is merely an exemplary embodiment in which the vehicle of the present embodiment assigns the weights to determining the location of the surrounding vehicles, and there is no limitation on the operation of the vehicle acquiring the surrounding objects information.

Figure 4:
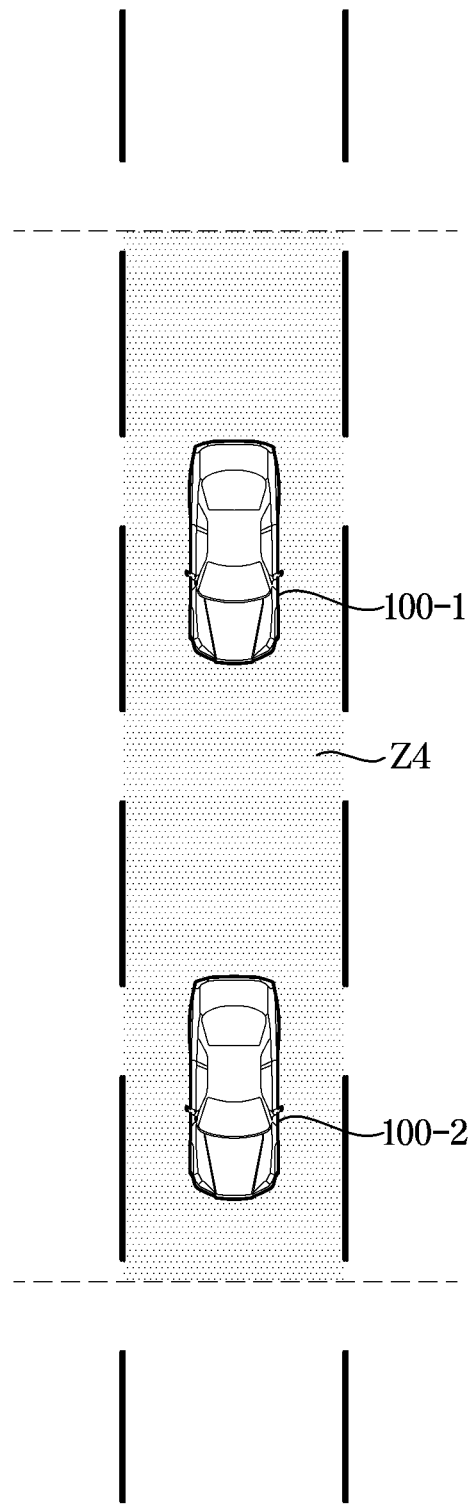
FIG. 4 is an illustrative view for explaining an MRM according to an exemplary embodiment.

FIG. 4 is an illustrative view for explaining the MRM according to the embodiment.

The controller may transmit the MRM to the server based on a region in which the vehicles 100-1 and 100-2 travel.

Specifically, when the vehicle 100-1 enters the road in a Z4 area, the controller may transmit the MRM of the corresponding area to the server.

Meanwhile, the server may compare a level of the received MRM with the level of the reference MRM stored in the server.

When the level of the MRM transmitted by the vehicle is lower than the level of the reference MRM, the server may transmit the reference MRM to the vehicle 100-2 to induce the autonomous driving of the vehicle.

Meanwhile, the controller may update the MRM through communication with the server based on the road condition in which the vehicle travels.

Specifically, the controller may update the MRM based on information of a road surface abnormality or a failure of a preceding vehicle.

For example, in determining the road surface abnormality, when an MRM alarming value or an MRM confirmed value transmitted to the server by vehicles passing a specific section occurs greater than those of a vehicle's suspension vibration magnitude and the corresponding MRM alarming value is greater than a specific value, the controller may determine that the road surface is abnormal.

The specific value may be determined by a ratio of the number of the MRM alarming to the number of traveling vehicles. In this case, the MRM may be transmitted to a vehicle entering the corresponding section.

Herein, the MRM alarming value does not refer to the MRM confirmed value, but may refer to a degree of vibration occurrence of the vehicle detected for a certain time.

Furthermore, when the corresponding level is greater than a specific level, the MRM alarming value may be changed to the MRM confirmed value.

The controller may update the MRM through communication with the server based on a weather condition in which the vehicle travels.

The controller, according to an exemplary embodiment, may update the MRM based on weather information including a freezing state of the road on which the vehicle travels, that is, a frequency of occurrence of black ice.

Meanwhile, the controller may determine the degree of vehicle pull and the degree of vehicle slip in consideration of the lateral and longitudinal orientation angles and the slip ratio of the vehicle.

When it is determined that the degree of vehicle pull and the degree of the vehicle slip are not the normal driving situation, the vehicle may update the MRM in the server and then perform related control.

Furthermore, the controller may update the risk information through communication between the vehicle and the surrounding vehicles or the server.

After generating the MPC model for the surrounding vehicles, the controller may update the related MRM information to lower the degree of risk for paths that do not cause a collision but is at high-risk.

When the MRM information is updated from the MPC models, the controller may impose constraints on the speed and the steering angle of the vehicle so as to reduce the degree of collision risk.

The MPC model used herein may be modeled through a kinematic bicycle model as an example.

The kinematic bicycle model is a model that considers front and rear wheels, and may be interpreted as a model that considers a slip angle. Also, the kinematic bicycle model may be interpreted by nonlinear differential equations in Cartesian frame, which is the coordinates of the center of mass.

The vehicle may be driven along a path of the MPC model, and when an expected driving path of the other vehicle is close to a predicted driving path of the vehicle, the MRM may be updated by determining the degree of risk.

On the other hand, the operation described in FIG. 4 is merely an example describing the operations of forming and transmitting and receiving the MRM mentioned in the present embodiment, and there is no limitation on the operations.

Figure 5:
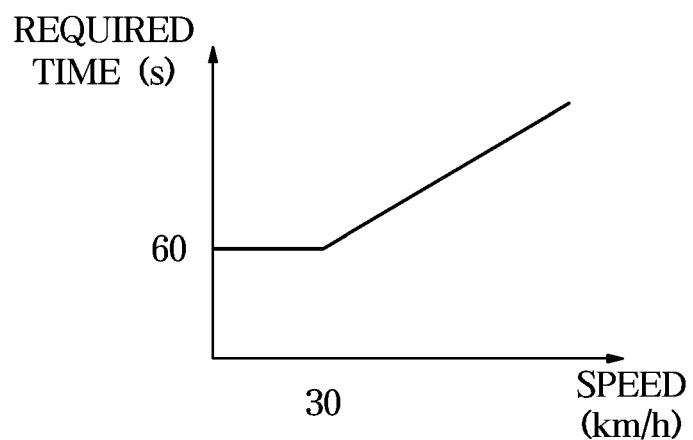
FIG. 5 is a view for explaining a time for forming surrounding objects information related to a vehicle according to an exemplary embodiment.

FIG. 5 is a view for explaining a time for forming surrounding objects information related to the vehicle according to an exemplary embodiment.

The controller may determine a time for forming the surrounding objects information related to the vehicle based on the road on which the vehicle travels and the speed of the vehicle.

Specifically, a sensor storage data acquisition time may be changed depending on traveling speed and traveling environment of the vehicle.

When the vehicle is traveling at high speed, a longer time may be required until the vehicle is stopped or the vehicle is evacuated to a safe situation.

Meanwhile, when the vehicle is traveling on a highway or an expressway, a longer time may be required for evacuation.

Referring to FIG. 5, the vehicle may calculate a required time based on the traveling speed of the vehicle and calculate the weights based on the traveling environment.

According to an exemplary embodiment, when the vehicle travels at lower than 30 km/h, the required time for the vehicle to evacuate may be determined as 60 seconds.

Meanwhile, when the vehicle is traveling at 30 km/h or more, the controller may determine the required time for evacuation to be 60 seconds or more. The graph shown in FIG. 5 is an exemplary embodiment of the present disclosure, and implementation of determining the required time for evacuation is not limited thereto.

Furthermore, the controller may assign different weights to each road on which the vehicle travels. According to an exemplary embodiment, when the vehicle travels on a back road, the weight may be determined to be 0.7. Furthermore, different weights may be assigned depending on the traveling environment of the vehicle, for example, 1 for normal roads and 1.3 for highways.

For example, when the vehicle is traveling on the back road at 20 km/h, the controller may determine the required time for evacuation to be 4.2 seconds.

On the other hand, these weights are merely an exemplary embodiment for implementing the present disclosure, and there is no limitation on a range or a method of determining the weights.

Figure 6:
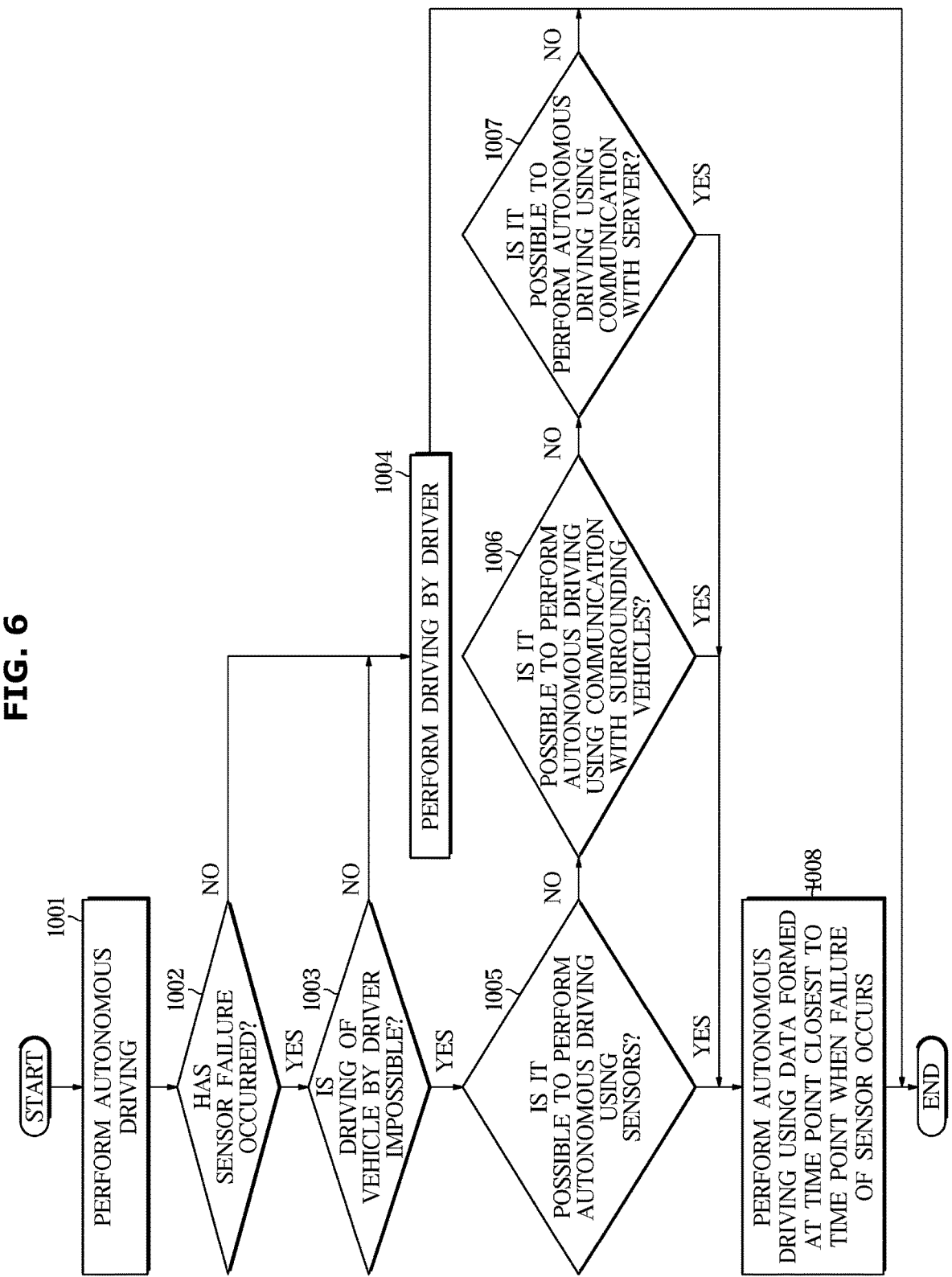
FIGS. 6 and 7 are flowcharts according to exemplary embodiments.
Figure 7:
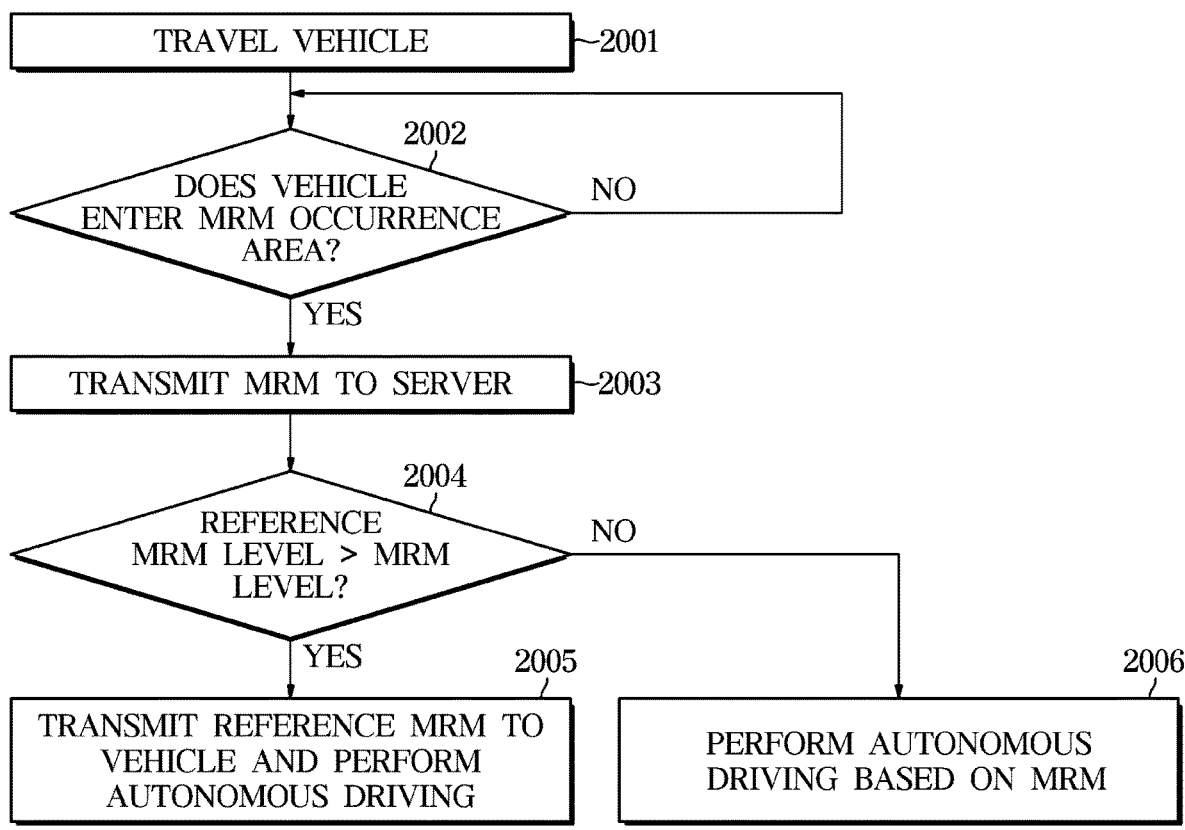

FIGS. 6 and 7 are flowcharts according to an exemplary embodiment.

Referring to FIG. 6, an operation for performing the autonomous driving of the vehicle is illustrated.

The vehicle may perform the autonomous driving (1001).

Furthermore, the vehicle determines whether the sensor failure has occurred (1002). That is, the vehicle may determine whether the failure has occurred in sensors constituting the vehicle, such as sensors performing the autonomous driving.

For example, the vehicle determines whether the sensor failure has occurred while the vehicle performs the autonomous driving.

The vehicle may perform operation 1003 when it is determined that the sensor failure has occurred (if YES to 1002), otherwise it may perform operation 1004 (if NO to 1002).

Meanwhile, when it is determined that driving of the vehicle by the driver is impossible (YES to 1003), the vehicle may perform the autonomous driving by sequentially using the sensors, communication with the surrounding vehicles, and communication with the server.

On the other hand, when driving of the vehicle by the driver not impossible (NO to 1003), driving by the driver is performed (1004).

The vehicle may perform operation 1005 when it is determined that driving of the vehicle by the driver is impossible (YES to 1003), otherwise it may perform operation 1004 (if NO to 1003).

The vehicle may perform driving by the driver (1004).

The vehicle may determine whether it is possible to perform the autonomous driving using the sensors (1005).

The vehicle may perform operation 1008 when it is possible to perform the autonomous driving using the sensors (if YES to 1005), otherwise it may perform operation 1006 (if NO to 1005).

The vehicle may determine whether it is possible to perform the autonomous driving using the communication with surrounding vehicles (1006).

The vehicle may perform operation 1008 when it is possible to perform the autonomous driving using the communication with the surrounding vehicles (if YES to 1006), otherwise it may perform operation 1007 (if NO to 1006).

The vehicle may determine whether it is possible to perform the autonomous driving using the communication with the server (1007).

The vehicle may perform operation 1008 when it is possible to perform the autonomous driving using the communication with the server (if YES to 1007), otherwise it may end the operation of the embodiment of FIG. 6 (if NO to 1007).

The vehicle may perform the autonomous driving using the data formed at the time point closest to the time point when the failure of the sensor occurs (1008).

FIG. 7 is a view showing a sequence for determining the MRM according to an exemplary embodiment.

Referring to FIG. 7, the vehicle travels (2001) and the controller determines whether the vehicle enters an MRM occurrence area (2002).

Meanwhile, when the vehicle enters the MRM occurrence area (YES to 2002), the vehicle may transmit an occurred MRM to the server (2003).

Meanwhile, when the level of the reference MRM is greater than the level of the MRM currently formed by the vehicle (YES to 2004), the server may transmit the reference MRM to the vehicle and the vehicle may perform the autonomous driving based on the reference MRM (2005).

Meanwhile, when the level of the MRM currently formed by the vehicle is greater than the level of the reference MRM (NO to 2004), the vehicle may perform the autonomous driving based on the level of the MRM currently formed by the vehicle (2006).

As is apparent from the above, the vehicle and the autonomous driving system can perform safe autonomous driving using map information and communication with the server when the sensor failure in the vehicle occurs.

Meanwhile, the disclosed embodiments may be implemented in the form of a recording media for storing instructions to be carried out by a computer. The instructions may be stored in the form of program codes, and when executed by a processor, may generate program modules to perform an operation in the embodiments of the present disclosure. The recording media may correspond to computer-readable recording media.

The computer-readable recording media includes any type of recording media having data stored thereon that may be thereafter read by a computer. For example, it may be a Read Only Memory (ROM), a Random Access Memory (RAM), a magnetic tape, a magnetic disk, a flash memory, an optical data storage device, and the like.

The exemplary embodiments of the present disclosure have thus far been described with reference to accompanying drawings. It will be obvious to those of ordinary skill in the art that the present disclosure may be practiced in other forms than the exemplary embodiments as described above without changing the technical idea or essential features of the present disclosure. The above exemplary embodiments are only by way of example, and should not be interpreted in a limited sense.

What is claimed is:

1. A vehicle for performing autonomous driving, the vehicle comprising:
    a memory configured to store map information;
    a sensor configured to acquire surrounding objects information related to the vehicle;
    a communicator configured to include one or more components that enable communication with a server and a surrounding vehicle; and
    a controller configured to include a processor, and to form autonomous driving data for the autonomous driving of the vehicle based on the map information and data acquired through the sensor and the communicator, wherein:
    based on a failure of the sensor occurring, and
    further based on a condition in which driving of the vehicle by a driver is not available at the same time that the sensor failure occurs,
    the controller is configured to cause performance of the autonomous driving of the vehicle based on the autonomous driving data formed at a time point closest to a time point at which the failure of the sensor occurs.

2. The vehicle of claim 1, wherein the controller is configured to cause the performance of the autonomous driving of the vehicle by sequentially using the surrounding objects information, communication data with the surrounding vehicle, communication data with the server, and the map information in response to the failure of the sensor.

3. The vehicle of claim 1, wherein the controller is configured to assign weights to the surrounding objects information acquired at the time point closest to the time point at which the failure of the sensor occurs.

4. The vehicle of claim 1, wherein the controller is configured to:
    transmit a minimum risk maneuver (MRM) to the server based on a region in which the vehicle travels; and
    in response to a level of the MRM being lower than a level of a reference MRM stored in the server, receive the reference MRM and direct control of the vehicle.

5. The vehicle of claim 4, wherein the controller is configured to update the MRM through communication with the server based on a road condition of a road on which the vehicle travels.

6. The vehicle of claim 4, wherein the controller is configured to update the MRM through communication with the server based on a weather condition in an area in which the vehicle travels.

7. The vehicle of claim 4, wherein the controller is configured to update the MRM through communication with the surrounding vehicle and the server.

8. The vehicle of claim 1, wherein the controller is configured to determine a time for forming the surrounding objects information related to the vehicle based on a road on which the vehicle travels and a speed of the vehicle.

9. An autonomous driving system, the system comprising:
    a server; and
    a vehicle configured to communicate with the server, wherein the vehicle is configured to transmit a minimum risk maneuver (MRM) to the server in response to satisfaction of a predetermined condition, and wherein the server is configured to transmit a pre-stored reference MRM to the vehicle in response to a level of the MRM being lower than a level of the reference MRM,
    wherein the vehicle comprises:
    a memory configured to store map information;
    a sensor configured to acquire surrounding objects information related to the vehicle;
    a communicator configured to include one or more components that enable communication with the server and a surrounding vehicle; and
    a controller configured to include a processor, and to cause performance of an autonomous driving of the vehicle based on an autonomous driving data formed at a time point closest to a time point at which a failure of the sensor occurs in response to:
    the failure of the sensor, and
    a determination that driving of the vehicle by a driver is not available.

10. The system of claim 9, wherein the MRM is based on a road condition of a road on which the vehicle travels.

11. The system of claim 9, wherein the MRM is based on a weather condition in which the vehicle travels.

12. The system of claim 9, further comprising the surrounding vehicle traveling in a vicinity of the vehicle, wherein the vehicle is configured to update the MRM based on a positional relationship with the surrounding vehicle.

13. The system of claim 9, wherein the controller is configured to cause the performance of the autonomous driving of the vehicle by sequentially using the surrounding objects information, communication data with the surrounding vehicle, communication data with the server, and the map information in response to the failure of the sensor.

14. The system of claim 9, wherein the controller is configured to assign weights to the surrounding objects information acquired at the time point closest to the time point at which the failure of the sensor occurs.

15. The system of claim 9, wherein the controller is configured to update the MRM through communication with the surrounding vehicle and the server.

16. The system of claim 9, wherein the controller is configured to determine a time for forming the surrounding objects information related to the vehicle based on a road on which the vehicle travels and a speed of the vehicle.

17. A method for performing autonomous driving of a vehicle, the method comprising:
    detecting failure of a first sensor during driving of the vehicle;
    in response to the detecting, determining that the driving of the vehicle by a driver is not available;
    in response to the determining, further determining it is possible to perform the autonomous driving using a second sensor, communication with surrounding vehicles, or communication with a server; and in response to the further determining, performing the autonomous driving using data formed at a time point closest to a time point when the failure of the first sensor is detected.

18. The method of claim 17, further comprising:
transmitting a minimum risk maneuver (MRM) to the server based on a region in which the vehicle travels; and
in response to a level of the MRM being lower than a level of a reference MRM stored in the server, receiving the reference MRM and controlling the vehicle according to the reference MRM.

* * * * *